April 7, 1936. T. H. LONG 2,036,286

LIGHT CONTROL DEVICE

Filed June 29, 1932 2 Sheets-Sheet 1

WITNESSES:
E. A. McCloskey.
Hymen Diamond

INVENTOR
Thomas H. Long.
BY F. W. Lyle.
ATTORNEY

April 7, 1936.　　　　T. H. LONG　　　　2,036,286
LIGHT CONTROL DEVICE
Filed June 29, 1932　　　2 Sheets-Sheet 2
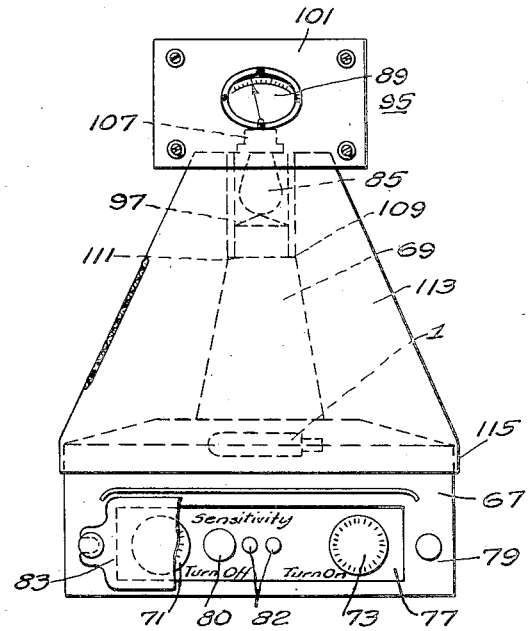
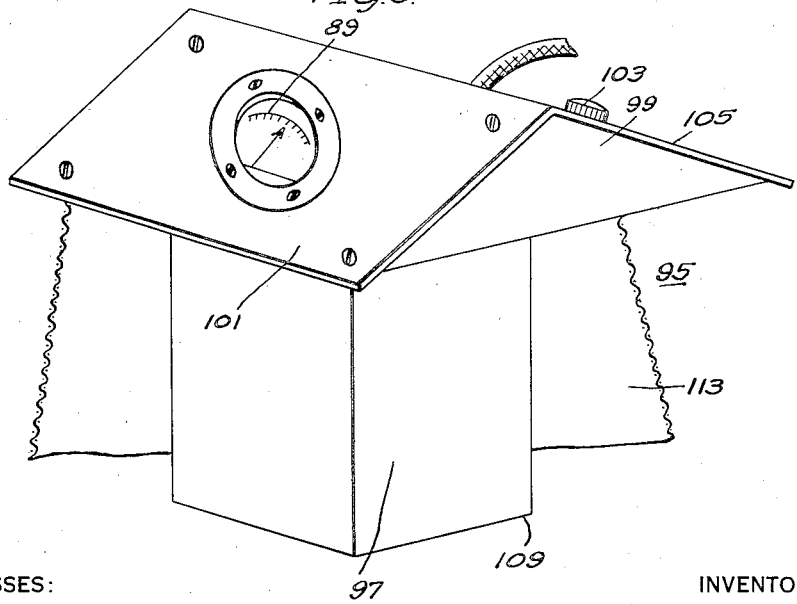
WITNESSES:　　　　　　　　　　　　　　　INVENTOR
*E. A. McClaskey*　　　　　　　　　　　　*Thomas H. Long.*
*Hymen Diamond*　　　　　　　　　　　BY *F. W. Legle*
　　　　　　　　　　　　　　　　　　　ATTORNEY

UNITED STATES PATENT OFFICE 2,036,286

LIGHT CONTROL DEVICE

Thomas H. Long, Irwin, Pa., assignor to Westinghouse Electric & Manufacturing Company, East Pittsburgh, Pa., a corporation of Pennsylvania Application June 29, 1932, Serial No. 619,955

5 Claims. (Cl. 250—41.5)

My invention relates to illumination control apparatus and has particular relation to the adjusting appurtenances provided to regulate the response of the apparatus.

Illumination control apparatus, in general, comprises a photo-sensitive device to respond to the illumination within a region to be controlled. The output of the photo-sensitive device is suitably amplified and energizes or de-energizes a system of relays to turn the illumination on or to turn it off.

When the natural illumination in the region attains a predetermined minimum value, the relay system is suitably actuated and the artificial illumination is turned on. On the other hand, when the totality of natural and artificial illumination in the region attains a predetermined maximum value the relay system is again actuated, this time in such manner as to turn off the artificial illumination.

It is to be noted that the turn-on value of the illumination and the turn-off value of the illumination are not, in general, identical. This condition arises particularly by reason of the fact that when the natural illumination attains a predetermined minimum value and the artificial illumination is turned on the total illumination in the region is abruptly increased and unless apparatus is provided for preventing hunting of the system the illumination will be periodically turned on and off and an unsatisfactory condition will thus be produced in the region to be illuminated. The same condition would also exist, if turn-on and turn-off values were identical, when the natural and artificial illumination in the region attains a predetermined maximum value and the illumination is turned off. In such a case, the illumination is suddenly decreased and pumping, the effect described in detail hereinabove, would take place.

It is apparent, therefore, that apparatus must be provided for abruptly so changing the condition of the system when the illumination is turned on or turned off that the condition of the relays is accentuated in the sense in which the change has occurred. If the illumination is turned on by excitation of relays having a small differential in the excitation required for pick-up and drop-out, added excitation must be abruptly applied to the relays to maintain them in energized condition in spite of the abrupt increase in illumination. On the other hand, the excitation of the same relays must be abruptly decreased when the relays are de-energized to turn off the artificial illumination.

The objects of the system are however in general accomplished by utilizing relays of the lag loop type having a considerable differential in the excitation required for pick-up and drop out. Depending on the other elements of the system and the desired operation, the excitation of these relays is abruptly changed in one sense or the other when they operate. Under certain circumstances it is desirable that the excitation of the lag loop relays be decreased to a certain extent when the relays pick up thus to provide for the proper response of such relays when a change occurs to cause them to drop out. Under different circumstances it may be desirable to abruptly increase the excitation of the relays when they pick up. In either case the conditions of the system for which the relays pick up and drop out are designated as the turn-off and turn-on conditions.

It is an object of my invention to provide illumination control apparatus in which the turn-on condition and the turn-off condition shall be capable of accurate adjustment.

Another object of my invention is to provide a contrivance for accurately-adjusting the turn-on condition and the turn-off condition of illumination control apparatus.

A further object of my invention is to provide illumination control apparatus in which the turn-off adjustment may be regulated independently of the turn-on adjustment.

An incidental object of my invention is to provide a method for accurately calibrating illumination control apparatus to turn-on artificial illumination in a region when the natural illumination falls to a predetermined minimum value and to turn off the artificial illumination in a region when the totality of natural and artificial illumination in the region rises to a maximum value.

Another incidental object of my invention is to provide a simple, rapid, convenient and accurate method for readjusting a photo-sensitive device at regular intervals with regard to its operating points.

More concisely stated, it is an object of my inventiion to provide illumination control apparatus having distinct and definite turn-on and turn-off conditions which are adjustable and in addition, to provide a method and apparatus for adjusting the values of illumination at which the turn-on and the turn-off occur.

The novel features that I consider characteristic of my invention are set forth with particularity in the appended claims. The invention itself, however, both as to its organization and its method of operation together with additional objects and advantages will best be understood from the following description of a specific embodiment when read in connection with the accompanying drawings, in which:

Fig. 4 is a view in front elevation of an assembly embodying my invention comprising an illumination control unit having mounted thereon a calibrating unit, and Fig. 5 is a view in perspective showing certain essential features of the calibrating unit.

Figure 1:
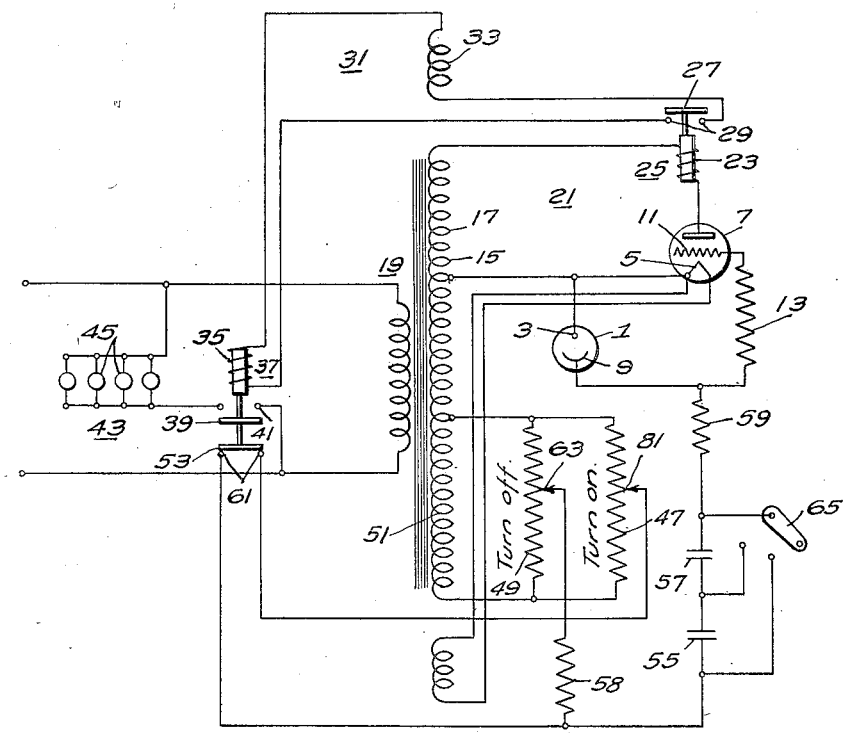
Figure 1 is a diagrammatic view showing an illumination control circuit embodying my invention.
Figure 2:
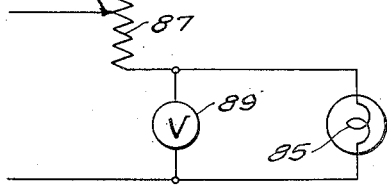
Fig. 2 is a diagrammatic view showing the circuit associated with the calibrating source to be utilized in the practice of my invention.

The apparatus shown in Fig. 1 comprises a photo-sensitive device 1, the anode 3 of which is connected to the cathode 5 of an amplifier 7, which may be of the gas filled or high vacuum type, and the cathode 9 of which is connected to the control electrode 11 of the amplifier through a suitable impedance 13 provided for the purpose of limiting the current through the photo-sensitive device 1 at high light intensities. The amplifier 7 and the photo-sensitive device 1 are both energized from a section 15 of the secondary 17 of a suitable supply transformer 19. The plate circuit 21 of the amplifier 7 includes the exciting coil 23 of a relay 25.

The photo-sensitive device is subjected to the illumination in the region for which the lighting is to be controlled. If the natural illumination in the region exceeds a predetermined minimum value the exciting coil 23 is energized and a movable contactor 27 of the relay 25 is disengaged from corresponding fixed contacts 29. On the other hand when the natural illumination in the region falls below the minimum value, the relay 25 is de-energized and the contactor 27 engages the fixed contacts 29 to close a circuit 31 through another section 33 of the secondary 17 of the transformer 19 and through the exciting coil 35 of a second relay 37. One movable contactor 39 of the last named relay then engages a plurality of fixed contacts 41 to close a circuit 43 for energizing the artificial illumination 45 in the region.

The turn-on condition and the turn-off condition of the system are regulated from a plurality of potentiometers 47 and 49 connected across a predetermined number of windings 51 of the section 15 of the secondary 17 whereby power is supplied to the amplifier 7 and to the photo-sensitive device 1. The movable tap of the turn-on potentiometer 47 is connected to the control electrode 11 of the electric discharge device 7 through an auxiliary movable contactor 53 of the relay 37 whereby the artificial illumination 45 is energized through a plurality of capacitors 55 and 57, through a resistor 59 and through the grid impedance 13. The turn-off potentiometer 49 is connected to the control electrode 11 of the electric discharge device 7 through the capacitors 55 and 57, the resistors 58 and 59 and the impedance 13.

The auxiliary contactor 53 of the relay 37 is in engagement with its corresponding fixed contacts 61 when the relay is de-energized. Consequently, when the region is under the influence of only the natural illumination, the photo-sensitive device 1 and the control electrode 11 of the electric discharge device 7 are biased principally from the turn-on potentiometer 47. When the natural illumination in the region to be illuminated falls below the predetermined value the relay 25 is de-energized and consequently the relay 37 is energized. While one movable contactor 39 engages the corresponding fixed contacts 41 to energize the artificial illumination 45 the other contactor 53 is disengaged from the corresponding fixed contact 61 and opens the circuit through the turn-on potentiometer 47. The bias is now applied exclusively through the turn-off potentiometer 49.

It is seen that while the artificial illumination 45 is energized the amplifier 7 is completely under the influence of the turn-off potentiometer 49 and consequently, the turn-off condition of the system is a function only of the position of the variable tap 63 of the turn-off potentiometer and may be adjusted independently of the turn-on condition. This situation is of considerable advantage since it enables the operator to accurately adjust the turn-off position and then to adjust the turn-on position without changing the turn-off condition.

The capacitors 55 and 57 connected in series with the two potentiometers 47 and 49 are utilized for the purpose of varying the sentitivity of the system. As will be noted, a suitable switch 65 is provided for the purpose of short-circuiting either one or both of the capacitors 55 and 57. When both of the capacitors are short-circuited the sensitivity is low. When only one of the capacitors 55 is short-circuited the sensitivity is medium while when neither of the capacitors are short-circuited, the sensitivity is high.

It is seen that by thus varying the impedance in the circuit of the photo-sensitive device 1, the operating range within the control of the potentiometers is varied. In a specific system constructed according to my invention with a photo-sensitive device 1 of high sensitivity and with an impedance 59 of 5 megohms the control of the potentiometers is as high as 150 foot candles turn-off and 75 foot candles turn-on for the setting of low sensitivity. For the high-sensitivity setting the range of control for the same photo-sensitive device is from 0 to 8 foot candles turn-off and from 0 to 4 foot candles turn-on. For the medium setting the corresponding ranges are from 0 to 40 foot candles and from 0 to 20 foot candles.

In Fig. 4 the container 67 wherein the illumination control unit is disposed is shown in front elevation. The photo-sensitive device 1 is disposed in a horizontal position directly below the base of a transparent truncated pyramid 69 through which the illumination in the region controlled by the unit is admitted.

Suitable knobs 71 and 73 are provided in an inset 77 in one wall 79 of the container 67 for the external control of the positions of the movable taps 63 and 81 of the turn-off and turn-on potentiometers 49 and 47. The sensitivity is controlled by inserting a plug 80 in one or the other of the receptacles 82. A metallic cover 83 is screwed to the wall 79 of the containers 67 and completely encloses the inset 77 which is provided for the purpose of protecting the adjustment knobs, 71, 73 and 75.

The turn-on and turn-off conditions of the illumination control system may be adjusted by first subjecting the photo-sensitive device exclusively to illumination having the value of the maximum turn-off illumination desired. The movable tap 63 of the turn-off potentiometer 49 is then varied until the exciting coil 35 of the relay 37 provided for the purpose of energizing or de-energizing the artificial illumination 45 is just de-energized. The minimum turn-on illumination is then exclusively applied to the photo-sensitive device 1 and the adjustable tap 81 of the corresponding potentiometer 47 is varied until the relay 37 just becomes energized.

The calibrating illumination device comprises a source of illumination 85 to be energized from a power supply source through a variable resistor 87 and a voltmeter 89 connected across the source. The output of the source 85 is controlled by varying the movable tap 91 of the resistor 87 and is indicated on the voltmeter 89.

Figure 3:
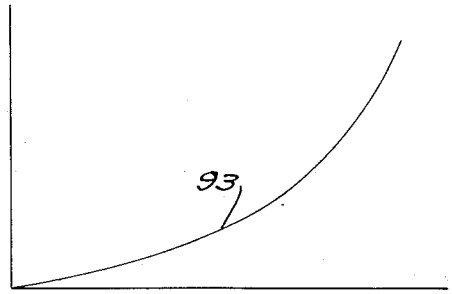
Fig. 3 is a graph showing the relationship between the voltage impressed across a calibrating source utilized in the practice of my invention and the illumination output of the source as measured by a photo-sensitive device having the usual characteristics.

The voltmeter 89 may be calibrated in foot candles or other illumination units or it may be calibrated in volts and the illumination units corresponding to the volts may be obtained from a curve 93 of the type shown in Fig. 3 in which the illumination units are plotted as a function of the voltage impressed across the filament of a lamp. It is to be noted that in general each source has different curve of the type shown in Fig. 3 and that for this reason probably the system in which the meter 89 connected across the source 85 reads in volts rather than illumination units, is preferred.

The calibrating source 85, the meter 89 and the resistor 87 are mounted in a housing 95. As is shown in Figs. 4 and 5 the housing comprises a box like cover structure 97 one end of which is open and on the other end of which a prismatic top 99 is mounted. The indicating face of the meter 89 projects through one wall 101 of the housing 95, while a knob 103 provided for the purpose of varying the position of the variable tap 91 of the resistor 87 projects from another wall 105. The source 85 is mounted in a suitable base 107 properly received within the walls 101 and 105 of the housing and projects downwardly into the box-like structure 97. The inner faces of the walls of the box 97 are painted black and no perceptible light is therefore reflected from the walls.

When the calibrating unit is in use the open end 109 of the box 97 is supported on a flange 111 provided on the transparent truncated pyramid 69 of the illumination control container 67. The calibrating unit 95 is moreover provided with an opaque, preferably black cover 113, which is secured to the prismatic top 99 thereof and which is equipped at its lower open end with an elastic 115 such that it may be firmly secured to the container 67 of the illumination control unit when the calibrating unit 95 is mounted on the truncated transparent pyramid 69.

It is seen that by reason of the shielding provided by the cloth 113 and the open end box 97, the only illumination applied to the photo-sensitive device 1 of the illumination control unit through the transparent pyramid 69 is the luminous output of the calibrating source 85. On the other hand, the source may be adjusted to any suitable output and in consequence, thereof, the response of the illumination control unit may be easily regulated by simply moving the turn-on and turn-off knobs 71 and 73 until the proper condition is attained.

It will be noted that a specific embodiment of my invention has been described hereinabove. In particular it is to be noted that the turn-off condition has been shown to be independently adjustable from the turn-on condition. A system in which the turn-on condition is independently adjustable from the turn-off condition can be apparently attained by a slight modification of the system as shown. To attain this object is is only necessary that the contactor 53 be disengaged from its corresponding contacts 61 when the illumination is deenergized. This modification will result in an interchange of the functions of the potentiometers 47 and 49 and in the necessity of making the proper adjustments to suit the situation.

Although I have shown and described a certain specific embodiment of my invention, I am fully aware that many modifications are possible. My invention, therefore, is not to be restricted except in so far as is necessitated by the prior art and by the spirit of the appended claims.

I claim as my invention:

1. Apparatus for controlling the artificial illumination in a region comprising means to respond to the illumination within said region, means, to be actuated by said illumination-responsive means when the natural illumination within said region attains a predetermined lower value, for energizing the artificial illumination for said region, and to be actuated by said illumination-responsive means, when the totality of natural and artificial illumination within said region attains a predetermined upper value, for deenergizing said artificial illumination, and means including a plurality of potentiometers, for independently predetermining the upper and lower values of illumination at which said means actuated by said illumination-responsive means operates to turn on and turn off said artificial illumination.

2. Apparatus for controlling the arificial illumination in a region comprising means to respond to the illumination within said region, means, to be actuated by said illumination-responsive means when the natural illumination within said region attains a predetermined lower value, for energizing the artificial illumination for said region, and to be actuated by said illumination-responsive means, when the totality of natural and artificial illumination within said region attains a predetermined upper value, for deenergizing said artificial illumination, means including a plurality of potentiometers, for predetermining the upper and lower values of illumination at which said means actuated by said illumination-responsive means operates to turn on and turn off said artificial illumination and means for varying the operating range within the control of said potentiometers, said means including a variable impedance through which the current transmitted through the photosensitive device flows.

3. Photo-electric relay apparatus comprising a photo-electric device, an amplifier therefor having a grid controlled by the device, a switch responsive to the amplifier, a potentiometer connected with said grid for adjusting the charge thereon, a second potentiometer connected with said grid through said switch for adjusting the charge on said grid and a resistor in the connection with the first mentioned potentiometer whereby the second mentioned potentiometer predominates when the switch is operated.

4. Photo-electric relay apparatus comprising a photo-electric device, an amplifier therefor having a grid controlled by said device, a circuit controller connected to be responsive to said amplifier, a potentiometer connected with the grid of the amplifier for adjusting the grid bias and a second potentiometer connected with said grid in parallel with said first potentiometer for adjusting the grid bias and controlled by said circuit controller.

5. Photo-electric relay apparatus comprising a photo-electric device, an amplifier therefor having a grid controlled by said device, a circuit controller responsive to said amplifier, a plurality of potentiometers connected with the grid of the amplifier in parallel for separately adjusting the circuit closing and opening functions respectively of said controller, the connection of one of said potentiometers being controlled by the operation of said controller.

THOMAS H. LONG.